(12) United States Patent
Berglund et al.

(10) Patent No.: US 6,635,188 B1
(45) Date of Patent: Oct. 21, 2003

(54) WINDSHIELD WASHER AND DEICER

(75) Inventors: Kris A. Berglund, Okemos, MI (US);
Dilum D. Dunuwila, Okemos, MI
(US); Hasan Alizadeh, East Lansing,
MI (US)

(73) Assignees: **Board of Trustees of Michigan State
University**, East Lansing, MI (US);
Applied CarboChemicals, Alto, MI
(US)

( * ) Notice: Subject to any disclaimer, the term of this
patent is extended or adjusted under 35
U.S.C. 154(b) by 0 days.

(21) Appl. No.: 10/124,979

(22) Filed: Apr. 18, 2002

(51) Int. Cl.[7] ................................................ C09K 3/18
(52) U.S. Cl. ......................... 252/70; 106/13; 510/180; 510/181; 510/182
(58) Field of Search .................... 252/70; 106/13; 510/180, 181, 182

(56) References Cited

U.S. PATENT DOCUMENTS

| | | | |
|---|---|---|---|
| 3,617,363 A | * 11/1971 | Metzger et al. | 427/383.7 |
| 5,043,088 A | 8/1991 | Falla | |
| 5,152,902 A | 10/1992 | Koskan et al. | |
| 5,211,940 A | * 5/1993 | Ishiguro et al. | 424/49 |
| 5,725,865 A | * 3/1998 | Mane et al. | 424/401 |
| 5,772,912 A | 6/1998 | Lockyer et al. | |
| 5,932,529 A | 8/1999 | Storey | |
| 5,958,744 A | * 9/1999 | Berglund et al. | 435/145 |
| 6,156,226 A | * 12/2000 | Klyosov et al. | 252/70 |
| 6,265,190 B1 | * 7/2001 | Yedur et al. | 435/145 |
| 6,287,480 B1 | 9/2001 | Berglund et al. | |

OTHER PUBLICATIONS

Derwent Patent Abstract No. 1998–504521, abstract of Russian Patent Specification No. 2106402 (Mar. 1998).*

* cited by examiner

Primary Examiner—Anthony J. Green
(74) Attorney, Agent, or Firm—Ian C. McLeod

(57) ABSTRACT

Deicing and anti-icing compositions comprising a succinate salt and at least one freezing point depressant selected from the group consisting of monohydric alcohols, polyhydric alcohols, monomethyl or monoethyl ethers of polyhydric alcohols, and mixtures thereof. The compositions have enhanced ice-melting capacity compared to the ice-melting capacity of the succinate salt or the alcohol alone, particularly at temperatures below about −10° C. The compositions are particularly useful as a windshield deicer/washer. Particular embodiments of the compositions are environmentally friendly.

54 Claims, 1 Drawing Sheet

WINDSHIELD WASHER AND DEICER

CROSS-REFERENCE TO RELATED APPLICATION

Not applicable.

STATEMENT REGARDING FEDERALLY SPONSORED RESEARCH OR DEVELOPMENT

Not Applicable.

Reference to a "Computer Listing Appendix submitted on a Compact Disc"

Not Applicable.

BACKGROUND OF THE INVENTION (1) Field of the Invention

The present invention relates to deicing and anti-icing compositions comprising a succinate salt and at least one freezing point depressant selected from the group consisting of monohydric alcohols, polyhydric alcohols, monomethyl or monoethyl ethers of polyhydric alcohols, and mixtures thereof. The compositions have enhanced ice-melting capacity compared to the ice-melting capacity of the succinate salt or the alcohol alone, particularly at temperatures below about $-10°$ C. The compositions are particularly useful as a windshield deicer/washer. Particular embodiments of the compositions are environmentally friendly.

(2) Description of Related Art

Windshield washer fluids generally consist of water, a water miscible alcohol to depress the freezing point, a surfactant for lubricating, and a colorant. In a typical windshield deicer/washer composition, the composition contains 22 to 35 wt % methanol with the balance being water, a small amount of a surfactant, and a small amount of colorant (U.S. Pat. No. 5,932,529 to Storey). Other compositions containing heavier alcohols have been suggested (U.S. Pat. No. 5,043,088 to Falla and U.S. Pat. No. 5,772,912 to Lockyer et al.).

The desired characteristics for deicing or anti-icing compositions, in particular windshield deicer/washer compositions, are well known. The most important among these characteristics is the deicer's ability to melt ice quickly. In addition, the windshield deicer/washer compositions should have a sufficiently low viscosity to "wet" the windshield fully without smearing or streaking and should be compatible with the materials comprising the windshield an its immediate surroundings. The wetting properties of the composition aid cleaning off dirt, grime, bug juice, bird droppings, and the like during warmer seasons.

A further consideration is the flammability of the windshield deicer/washer composition. Liquids that have a flash point below $37.8°$ C. ($1000°$ F.) are considered flammable and liquids with a flash point above $37.80°$ C. are considered combustible (U.S. Pat. No. 5,932,529 to Storey). Flammable liquids are considered more hazardous by the National Fire Protection Association, local fire marshals, the U.S. Department of Transportation, and the Occupational Safety and Health Administration. Consequently, flammable liquids are more regulated and have storage restrictions which require more secure containers. Therefore, it is desirable that a windshield deicer/washer compositions be classified as a combustible fluid and not a flammable fluid.

The following U.S. patents are examples of deicing or anti-icing compositions.

U.S. Pat. No. 5,043,088 to Falla discloses a deicing composition which consists essentially of one or more monohydric alcohols, one or more polyhydric alcohols, and one or more anionic fluorinated surfactants in combination. The composition is useful for removing ice from a surface such as an automobile windshield.

U.S. Pat. No. 5,772,912 to Lockyer et al. discloses aqueous, non-electrolytic, non-toxic, biodegradable, continuous single phase liquid anti-icing or deicing compositions. The compositions comprise water, a non-toxic freezing point depressant which includes particular monohydric or polyhydric alcohols, a thickener, and optionally a corrosion inhibitor.

U.S. Pat. No. 5,932,529 to Storey discloses windshield deicer/washer compositions that include 18 to about 33% by volume methanol, 1 to 14% by volume propylene glycol, and the balance water and preferably a surfactant and colorant. The composition has a flash point above $37.80°$ C. which renders it a combustible fluid and not a flammable fluid.

The above deicer or anti-icing compositions all rely upon an alcohol, in particular methanol, to impart the ice-melting or ice-inhibiting properties to the compositions. While methanol is generally considered to be an effective deicer/anti-icer, other alcohols which are non-toxic, e.g., ethanol, are less effective. Furthermore, even though methanol is considered to be effective, its ice-melting capacity is limited. Therefore, there is a need for deicing and anti-icing compositions which have greater ice-melting capacities than those currently available. In particular, there is a need for deicing and anti-icing compositions which are non-toxic and which have an effective ice-melting capacity. Such compositions would be useful in windshield deicing and anti-icing compositions.

SUMMARY OF THE INVENTION

The present invention provides deicing and anti-icing compositions comprising a succinate salt and at least one freezing point depressant selected from the group consisting of monohydric alcohols, polyhydric alcohols, monomethyl or monoethyl ethers of polyhydric alcohols, and mixtures thereof. The compositions have enhanced ice-melting capacity compared to the ice-melting capacity of the succinate salt or the alcohol alone, particularly at temperatures below about $-100°$ C. The compositions are particularly useful as a windshield deicer/washer. Particular embodiments of the compositions are environmentally friendly.

Therefore, the present invention provides a composition which comprises in admixture (a) a succinate salt in an amount which acts to remove ice from a surface; and (b) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the admixture when mixed with water melts the ice more rapidly than either the succinate salt or the freezing point depressant alone.

In particular embodiments of the composition, the succinate salt is selected from the group consisting of potassium succinate (trihydrate), ammonium succinate (anhydrous), sodium succinate (hexahydrate), and combinations thereof.

In a further embodiments of the composition, the freezing point depressant is selected from the group consisting of methanol, ethanol, propanol, isopropanol, butanol, pentanol, and mixtures thereof. Preferably, the freezing point depressant is ethanol or the freezing point depressant is methanol or an admixture of the methanol and ethanol.

Preferably, the ratio of succinate salt to freezing point depressant in the composition is between about 1 to 10 to 10 to 1. More preferably, the ratio of succinate salt to freezing point depressant is 1 to 1.

In further embodiments of the composition, the composition further comprises the water in the admixture. Preferably, the composition comprises 20 to 30 wt % solids in solution with the water as the balance.

In further embodiments of the composition, the composition further comprises an organic surfactant which enables spreading of the composition on a glass surface, and a coloring agent.

In further embodiments of the composition, the composition in addition contains a glycol as an anti-icing agent.

In further embodiments of the composition, the composition in addition contains at least one corrosion inhibitor selected from the group consisting of an alkali metal polymer salt and magnesium succinate, an alkali metal polyaspartate and magnesium succinate, an alkali metal polysuccinimide, an alkali metal polyaspartate, and an alkali metal polymaleimide salt and magnesium succinate. In particular, wherein the alkali metal polymaleimide salt is sodium polymaleimide salt, the alkali metal polyaspartate is sodium polyaspartate, and the alkali metal polymaleimide salt is sodium polymaleimide salt.

The present invention also provides a method for deicing or anti-icing a surface which comprises applying a composition which comprises (a) an alkali metal succinate salt in an amount which acts to remove ice from a surface; and (b) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the composition melts ice formed on the surface more rapidly than either the succinate salt or the freezing point depressant alone.

In particular embodiments of the method, the succinate salt is selected from the group consisting of potassium succinate (trihydrate), ammonium succinate (anhydrous), sodium succinate (hexahydrate), and combinations thereof.

In a further embodiments of the method, the freezing point depressant is selected from the group consisting of methanol, ethanol, propanol, isopropanol, butanol, pentanol, and mixtures thereof. Preferably, the freezing point depressant is ethanol or the freezing point depressant is methanol or an admixture of the methanol and ethanol.

Preferably, the ratio of succinate salt to freezing point depressant in the composition is between about 1 to 10 to 10 to 1. More preferably, the ratio of succinate salt to freezing point depressant is 1 to 1.

In further embodiments of the method, the composition further comprises the water in the admixture. Preferably, the composition comprises 20 to 30 wt % solids in solution with the water as the balance.

In further embodiments of the method, the composition further comprises an organic surfactant which enables spreading of the composition on a glass surface, and a coloring agent. In particular embodiments, the surface to which the composition is applied is a glass in a vehicle, particularly, wherein the surface is a glass windshield of a vehicle with wipers and wherein the composition contains an organic surfactant for spreading the composition on the glass, optionally a glycol for removing ice, and optionally a coloring agent.

In further embodiments of the method, the composition in addition contains a glycol as an anti-icing agent.

In further embodiments of the method, the composition in addition contains at least one corrosion inhibitor selected from the group consisting of an alkali metal polymer salt and magnesium succinate, an alkali metal polyaspartate and magnesium succinate, an alkali metal polysuccinimide, an alkali metal polyaspartate, and an alkali metal polymaleimide salt and magnesium succinate. In particular, wherein the alkali metal polymaleimide salt is sodium polymaleimide salt, the alkali metal polyaspartate is sodium polyaspartate, and the alkali metal polymaleimide salt is sodium polymaleimide salt.

The present invention further provides a composition packaged for use as a windshield wiper fluid which comprises in admixture (a) a succinate salt in an amount which acts to remove ice from a surface; and (b) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the composition melts ice.

In particular embodiments of the composition, the succinate salt is selected from the group consisting of potassium succinate (trihydrate), ammonium succinate (anhydrous), sodium succinate (hexahydrate), and combinations thereof.

In a further embodiments of the composition, the freezing point depressant is selected from the group consisting of methanol, ethanol, propanol, isopropanol, butanol, pentanol, and mixtures thereof. Preferably, the freezing point depressant is ethanol or the freezing point depressant is methanol or an admixture of the methanol and ethanol.

Preferably, the ratio of succinate salt to freezing point depressant in the composition is between about 1 to 10 to 10 to 1. More preferably, the ratio of succinate salt to freezing point depressant is 1 to 1.

In further embodiments of the composition, the composition further comprises the water in the admixture. Preferably, the composition comprises 20 to 30 wt % solids in solution with the water as the balance.

In further embodiments of the composition, the composition further comprises an organic surfactant which enables spreading of the composition on a glass surface, and a coloring agent.

In further embodiments of the composition, the composition in addition contains a glycol as an anti-icing agent.

In further embodiments of the composition, the composition in addition contains at least one corrosion inhibitor selected from the group consisting of an alkali metal polymer salt and magnesium succinate, an alkali metal polyaspartate and magnesium succinate, an alkali metal polysuccinimide, an alkali metal polyaspartate, and an alkali metal polymaleimide salt and magnesium succinate. In particular, wherein the alkali metal polymaleimide salt is sodium polymaleimide salt, the alkali metal polyaspartate is sodium polyaspartate, and the alkali metal polymaleimide salt is sodium polymaleimide salt. OBJECTS Therefore, it is an object of the present invention to provide deicing and anti-icing compositions which have greater ice-melting capacities than those currently available.

It is also an object of the present invention to provide deicing and anti-icing compositions which are non-toxic and which have an effective ice-melting capacity.

DETAILED DESCRIPTION OF THE INVENTION

Figure 1:
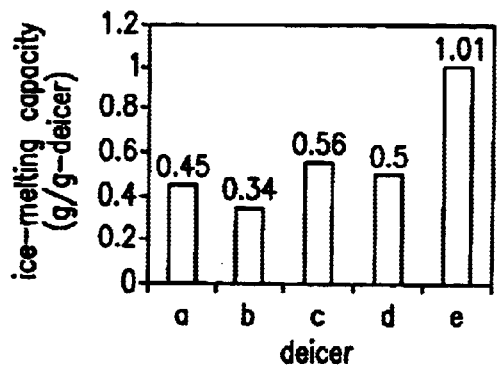
FIG. 1 is a graph which shows a comparison of the ice-melting capacities of several deicing compositions of the present invention to alcohol:water deicing formulations: a, potassium succinate:water (50:50); b, ethanol:water (50:50); c, methanol:water (50:50); d, potassium succinate:ethanol:water (10:40:50); and, e, potassium succinate:methanol:water (10:40:50).

All patents, patent applications, government publications, government regulations, and literature references cited in this specification are hereby incorporated herein by reference in their entirety. In case of conflict, the present description, including definitions, will control.

Monohydric alcohols, in particular methanol, have ice-melting capacity and, therefore, have been useful in deicing applications. Recently, it was shown in U.S. Pat. No. 6,287,480 to Berglund et al., which is assigned to common assignees, that succinate salts, in particular potassium, sodium, and ammonium succinate, have ice-melting capabilities and are less corrosive than conventional salt-based deicers. Now, it has been discovered that succinate salt solutions, particularly potassium succinate solutions, synergistically enhance the ice-melting capacity of alcohols such as ethanol and methanol when it is combined with the alcohol. As shown by the examples herein, compositions consisting of succinate salts, in particular potassium succinate, and alcohols, in particular methanol and ethanol, melt significantly more ice than any one of them alone or would be expected when in combination.

Therefore, the present invention provides deicing compositions which are useful for a wide range of applications such as automobile windshield deicer/washer solutions and melting ice on the surfaces of aircraft, airport pavements, roadways, walkways, bridges, entrance ways, structures, canals, locks, components, vessels, nautical components, railroad switches, steps, motor vehicles, and the like. The deicing compositions of the present invention comprise in a water base at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof and at least one hydrophilic organic acid salt, preferably a succinate salt, more preferably a succinate salt selected from the group consisting of potassium succinate (trihydrate), ammonium succinate (anhydrous), sodium succinate (hexahydrate), and combinations thereof. The compositions of the present invention are effective at temperatures well below freezing and melt significantly more ice than any of the constituents of the composition alone, particularly, the compositions comprising potassium succinate and methanol or ethanol. As shown herein, the compositions of the present invention are able to penetrate ice at temperatures to at least −10° C.

In general, the inclusion of the hydrophilic organic acid salt in the deicer composition provides sufficient wetting properties to the deicer compositions. U.S. Pat. No. 6,287,480 to Berglund et al. showed that the succinate salts, in particular potassium succinate, are non-corrosive organic salts which indicates that deicer compositions comprising potassium succinate are compatible with such materials as those comprising an automobile's windshield and its immediate surroundings, e.g., the rubber gasket and plastic trims, and a variety of metals and alloys which are susceptible to corrosion such as steel and aluminum. In addition, potassium succinate was discovered to be a corrosion inhibitor. Furthermore, alcohols are flammable and the inclusion of potassium succinate in alcohol-based deicer compositions was discovered to reduce the flammability of the alcohols which in turn reduced the hazardousness of the alcohol-based deicer compositions. However, as shown by the examples herein, it was discovered that potassium succinate in a synergistic manner enhances the ice-melting capacity of alcohols beyond that which would have been expected when the potassium succinate and alcohol were combined.

Monohydric alcohols are particularly effective at melting existing ice from a surface. Examples of monohydric alcohols include methanol, ethanol, n-propanol, isopropanol, butanol, and pentanol. Therefore, compositions comprising a succinate salt such as potassium succinate and at least one monohydric alcohol are particularly effective as deicing agents.

Polyhydric alcohols are particularly effective at providing resistance to re-freezing and re-formation of ice on a surface after the ice has once been melted. Examples of polyhydric alcohols are the alkylene and dialkylene glycols such as ethylene glycol, diethylene glycol, propylene glycol, and dipropylene glycol. Therefore, compositions comprising a succinate salt such as potassium succinate and at least one polyhydric alcohol are particularly effective as anti-icing agents. Compositions comprising a succinate salt such as potassium succinate and at least one monohydric alcohol and at least one polyhydric alcohol are particularly effective deicing and anti-icing agents.

Because of their viscosity, polyhydric alcohols are often used in deicing compositions in an amount sufficient to thicken the deicing composition to a viscosity sufficient to enable the deicing composition to cling to a surface. In general, because polyhydric alcohols are toxic, in cases where it is desirable that the deicing composition cling to a surface and be environmentally friendly, a non-toxic thickener is preferred. Non-toxic thickeners include hydrophilic heteropolysaccharide colloids such as those disclosed in U.S. Pat. No. 5,772,912 to Lockyer et al. Therefore, the compositions of the present invention further includes embodiments comprising a mixture of a succinate salt such as potassium succinate and a monohydric alcohol such as ethanol or methanol and an amount of polyhydric alcohol to impart a viscosity to the composition sufficient to enable the composition to cling to a surface. For environmentally friendly embodiments, the compositions comprises a mixture of a succinate salt such as potassium succinate and ethanol and a sufficient amount of a hydrophilic heteropolysaccharide colloid to impart a viscosity to the composition sufficient to enable it to cling to a surface.

In a preferred embodiment, the deicing composition comprises ethanol, methanol, or mixtures thereof and a succinate salt, preferably potassium succinate. Ethanol is preferred when environmental friendliness, i.e., environmental compatibility or biodegradability or non-toxicity, is the overriding requirement for the deicing composition. However, ethanol is not the only freezing point depressant suitable for the deicing composition of the present invention. Examples of other non-toxic freezing point depressants that are suitable in the deicing composition of the present invention include 1-propanol, 2-propanol, 1-butanol, 2-butanol, 2-methyl-1-propanol, 2-methyl-2-propanol, 1,2-propylene glycol, 1,3-propylene glycol, 1,4-butylene glycol, 1,3-butylene glycol, 2,3-butylene glycol, glycerol. The deicing composition of the present invention includes any one or any combination of the non-toxic freezing point depressants. However, when the overriding requirement for the deicing composition is rapid ice melting, methanol is the preferred freezing point depressant.

In general, it is preferred that the ratio of succinate salt to the alcohol in the compositions of the present invention be within the range of about 1 to 10 and 10 to 1. Most preferably, it is desirable that the ratio of succinate salt to alcohol be about 1 to 1. In particular embodiments, it is desirable that the ratio of succinate salt to alcohol to water be between about 5 to 65 to 30 and 20 to 50 to 65. It is preferred that the succinate salt and alcohol comprise between about 20 to 70 wt % of the composition, preferably between about 20 and 30 wt % of the composition, with the remainder of the composition comprising water. In particular embodiments of the compositions that comprise a succinate salt such as potassium succinate and a monohydric alcohol such as methanol, ethanol, or mixture thereof, the compositions further include a polyhydric alcohol such as a glycol to serve as an anti-icing agent. Thus, compositions which comprise a succinate salt such as potassium succinate and both one or more monohydric alcohols and one or more polyhydric alcohols have both deicing and anti-icing capacities and because of the viscosity imparted to the composition by the polyhydric alcohol, the composition effectively clings to the surfaces to which it is applied which extends the time in which deicing and anti-icing activities of the composition are active on the surface. That is particularly useful for deicing and preventing ice formation on non-level surfaces such as windshields, aircraft surfaces, and roadway surfaces.

Optionally, the compositions further include a surfactant to act as a lubricant or wetting agent or detergent to enhance the cleaning ability of the compositions of the present invention. A surfactant is particularly useful for compositions intended for windshield deicer/washer applications. Surfactants are well known in the art and include for example sodium dioctyl sulfosuccinate available as GEROPON SS-0-75 from Rhone Poulenc or AEROSOL OT-75 from ARCO, or a fluorinated surfactant such as ZONYL FSJ fluorosurfactant by E.I. DuPont de Nemours & Co., Wilmington, Delaware, and other surfactants as set forth in U.S. Pat. No. 5,043,088 to Falla. In a preferred embodiment, the surfactant is added at a rate of less than 2%, more preferably at a rate less than 0.1%, and more preferably at a rate from between about 0.001 to Optionally further still, the compositions further include a colorant or dye. Colorants are well known in the art and include for example Pylaklor WINDOW SPRAY BLUE S-405 which is a water soluble colorant available from Pylam Products Co., Inc. Tempe, Arizona and polymer bound triphenyl methane colorants such as LIQUITINT PATENT BLUE by Milliken Chemical, Spartanburg, South Carolina. In a preferred embodiment, the colorant is added at a rate of less than 0.1%, more preferably at a rate less than 0.001%.

Optionally further still, the compositions further include an effective amount of at least one corrosion inhibitor selected from the group consisting of an alkali metal polymer salt such as sodium polymaleimide salt and magnesium succinate, an alkali metal polyaspartate such as sodium polyaspartate and magnesium succinate, an alkali metal polysuccinimide such as sodium polysuccinimide, an alkali metal polyaspartate such as sodium polyaspartate and an alkali metal polymaleimide salt such as sodium polymaleimide salt, and magnesium succinate. The effectiveness of the specific corrosion inhibitors recited above is disclosed in U.S. Pat. No. 6,287,480 to Berglund et al. which also discloses that the corrosion inhibitors also enhanced the deicing capacity of deicing compositions. The corrosion inhibitors are useful for compositions intended for applications to roadway surfaces and metals such those on bridge structures, aircraft, metal steps, and motor vehicles.

The preparation of an alkali metal polyaspartate is well known in the art. For example, U.S. Pat. No. 5,152,902 to Koskan et al., discloses a process for the preparation of sodium polyaspartate. Briefly, solid phase L-aspartic acid is heated to produce polysuccinimide which is then hydrolyzed in the presence of sodium hydroxide to produce the sodium polyaspartate. Preparation of sodium polymaleimide involves anhydrously polymerizing maleimide in the presence of a metal catalyst and any alcohol initiator or a base to produce a maleimide polymer and then hydrolyzing the maleimide polymer with sodium hydroxide at 10 to 100° C. for at least 1 hour to produce the alkali metal polymaleimide salt.

In particular applications of the compositions of the present invention, it is desirable that the composition include friction enhancing agents or the composition be applied to a surface concurrently or sequentially with a friction enhancing agent. Applying the compositions concurrently or sequentially with a friction enhancing agent is particularly beneficial for improving the traction on roadways, walkways, bridges, and steps. The friction enhancing agents anticipated include, but are not limited to, sand, synthetic polymers, or pulverized organic material such as nut shells, wood fragments, seeds, bark, husks, kernels, and the like.

The following examples are intended to promote a further understanding of the present invention.

EXAMPLE 1

This example illustrates the synergistic enhancement in ice-melting capacity by particular succinate and alcohol mixtures.

The following method was used to determine the ice-melting capacities of the deicers. Twenty grams of water was frozen in a disposable petri dish at −10° C.

The following deicer compositions were tested: potassium succinate and water (50:50); ethanol and water (50:50); methanol and water (50:50); potassium succinate, ethanol, and water (10:40:50); and, potassium succinate, methanol, and water (10:40:50). For each deicer composition, ten grams of the deicer composition was cooled to −10° C. and then placed on the frozen water in the petri dish. After incubating at −10° C. for one hour, the liquid was poured out of the petri dish, weighed, and the melted component was determined.

The synergistic enhancement in the ice-melting capacity by succinate and alcohol mixtures is shown in FIG. 1. As shown, the replacement of one fifth of the alcohol content of the alcohol:water deicer compositions with potassium succinate doubled the ice-melting capacity of the methanol and significantly enhanced the ice-melting capacity of the ethanol. The potassium succinate:methanol compositions had significantly superior deicing capacity compared to all of the other compositions. Because of its outstanding performance, it can be marketed as a premium, high-performance windshield deicer.

Succinate is the salt of a naturally occurring organic acid and ethanol is a non-toxic alcohol, therefore, it was significant to discover that the potassium succinate:ethanol:water (10:40:50) composition outperformed the methanol:water (50:50) composition. The toxicity of methanol, which is the primary constituent of commercially available deicers is well-known. The discovery that the succinate:ethanol:water composition had outperformed the methanol:water composition indicates that the environmentally friendly deicer compositions of the present invention can be used as an alternative to the conventional methanol:water based deicers without having to endure a sacrifice in deicing capacity.

EXAMPLE 2

In general, commercially available windshield deicer/washer compositions contain about 22 to 35 wt % methanol. This example illustrates that the addition of potassium succinate to alcohol-containing windshield deicer/washer compositions synergistically enhanced the deicing capacity of the alcohol-containing deicer/washer compositions.

Figure 2:
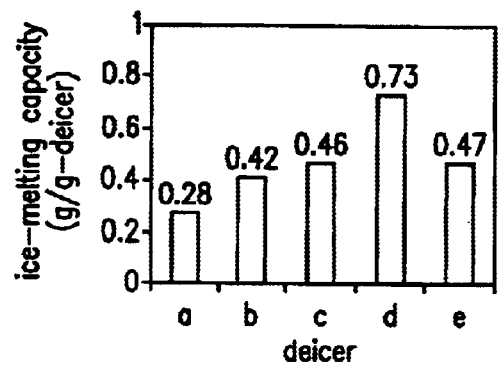
FIG. 2 is a graph which shows a comparison of the ice-melting capacities of several deicing compositions of the present invention to alcohol:water deicing formulations and to RainX®, a commercially available premium windshield deicer/washer containing 35 wt % methanol in water: a, ethanol:water (35:65); b, methanol:water (35:65); c, potassium succinate:ethanol:water (17.5:17.5:65); d, potassium succinate:methanol:water (17.5:17.5:65); and, e, RainX®.

The method for evaluating the deicing capacity of the deicer/washer compositions of the present invention was performed as described in Example 1. As shown in FIG. 2, the synergy between the potassium succinate and the alcohols is readily apparent. As was expected, the ice-melting capacity of the methanol:water (35:65) compositions was equal to that of RainX®, a commercially available premium windshield deicer/washer consisting of 35% methanol. As shown in FIG. 2, the performance of the potassium succinate:ethanol:water (17.5:17.5:65) composition was comparable to RainX®. This result indicated that deicer/washer compositions comprising potassium succinate:ethanol:water can be marketed as natural, environmentally friendly, and nontoxic windshield deicers/washers. Also shown in FIG. 2 is that the potassium succinate:methanol:water (17.5:17.5:65) composition had substantially higher deicing capacity than any of the other compositions. Therefore, it can be marketed as a premium, high-performance windshield deicer/washer.

EXAMPLE 3

The performance level of more concentrated deicer compositions of the present invention were evaluated. Aqueous deicer compositions of the present invention comprising 70 wt % of an admixture of succinate salt and alcohol were evaluated.

Figure 3:
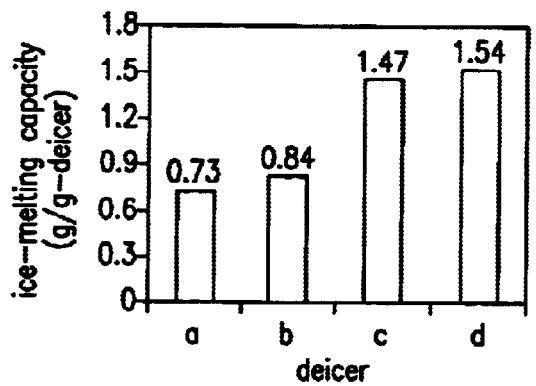
FIG. 3 is a graph which shows a comparison of the ice-melting capacities of several formulations of the deicing compositions of the present invention: a, potassium succinate:methanol:water (5:65:30); b, potassium succinate:methanol:water (10:60:30); c, potassium succinate:methanol:water (15:55:30); and, d, potassium succinate:methanol:water (20:50:65).

The method for evaluating the deicing capacity of the compositions of the present invention was performed as described in Example 1. As shown in FIG. 3, freezing point depression was the underlying reason for ice dissolution. The data in FIG. 3 demonstrates that increasing the ratio of potassium succinate to methanol resulted in a dramatic depression of the freezing point which led to a corresponding increase in ice-melting capacity. The step change of the ratio of potassium succinate to methanol from 10:60 to 15:55 doubled the ice-melting capacity. Compositions with a ratio greater than 15:55 were capable of melting 1.5 grams of ice per gram of deicer. These compositions are useful for melting ice on the surfaces of aircraft, airport pavements, roadways, walkways, bridges, entrance ways, structures, canals, locks, components, vessels, nautical components, railroad switches, steps, motor vehicles, and the like. For particular applications, the compositions of the present invention further includes thickening agents such as propylene glycol to provide the compositions of the present invention with anti-icing capabilities.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A composition which comprises in admixture:
   (a) a succinate salt selected from the group consisting of potassium, ammonium, and sodium succinate salts in an amount which acts to remove ice from a surface;
   (b) an organic surfactant which enables spreading of the composition on a glass surface; and
   (c) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the admixture when mixed with water melts the ice more rapidly than either the succinate salt or the freezing point depressant alone.

2. The composition of claim 1 wherein the succinate salt is selected from the group consisting of potassium succinate (trihydrate), ammonium succinate (anhydrous), sodium succinate (hexahydrate), and combinations thereof.

3. The composition of claim 1 wherein the freezing point depressant is selected from the group consisting of methanol, ethanol, propanol, isopropanol, butanol, pentanol, and mixtures thereof.

4. The composition of claim 1 wherein the ratio of succinate salt to freezing point depressant is between about 1 to 10 to 10 to 1.

5. The composition of claim 1 wherein the ratio of succinate salt to freezing point depressant is about 1 to 1.

6. The composition of claim 1 wherein the composition further comprises the water in the admixture.

7. The composition of claim 6 comprising 20 to 30 wt % solids in solution with the water as the balance.

8. The composition of claim 6 or 7 wherein the freezing point depressant is ethanol.

9. The composition of claim 6 or 7 wherein the freezing point depressant comprises methanol or an admixture of methanol and ethanol.

10. The composition of any one of claims 1, 2, 3, 4, 5, 6 or 7 wherein the composition further comprises a coloring agent.

11. The composition of any one of claims 1, 2, 3, 4, 5, 6, or 7 which comprises a glycol as an anti-icing agent.

12. The composition of any one of claims 1, 2, 3, 4, 5, 6, or 7 which in addition contains at least one corrosion inhibitor selected from the group consisting of an alkali metal polymer salt and magnesium succinate, an alkali metal polyaspartate and magnesium succinate, an alkali metal polysuccinimide, an alkali metal polyaspartate, and an alkali metal polymaleimide salt and magnesium succinate.

13. The composition of claim 12 wherein the alkali metal polymaleimide salt is sodium polymaleimide salt, the alkali metal polyaspartate is sodium polyaspartate, and the alkali metal polymaleimide salt is sodium polymaleimide salt.

14. A method for deicing or anti-icing a surface which comprises applying a composition which comprises:
    (a) an alkali metal succinate salt in an amount which acts to remove ice from a surface; and
    (b) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the composition melts ice formed on the surface more rapidly than either the succinate salt or the freezing point depressant alone.

15. The method of claim 14 wherein the alkali metal succinate salt is selected from the group consisting of potassium succinate (trihydrate), sodium succinate (hexahydrate), and combinations thereof.

16. The method of claim 14 wherein the freezing point depressant is selected from the group consisting of methanol, ethanol, propanol, isopropanol, butanol, pentanol, and mixtures thereof.

17. The method of claim 14 wherein the ratio of succinate salt to freezing point depressant is between about 1 to 10 to 10 to 1.

18. The method of claim 14 wherein the ratio of succinate salt to freezing point depressant is about 1 to 1.

19. The method of claim 14 wherein the composition further comprises the water in the admixture.

20. The method of claim 19 comprising 20 to 30 wt % solids in the water as the balance.

21. The method of claim 19 or 20 wherein the freezing point depressant is ethanol.

22. The method of claim 19 or 20 wherein the freezing point depressant comprises methanol or an admixture of methanol and ethanol.

23. The method of any one of claims 14, 15, 16, 17, 18, 19, or 20 wherein the composition further comprises an organic surfactant which enables spreading of the composition on a glass surface, and a coloring agent.

24. The method of any one of claims 14, 15, 16, 17, 18, 19, or 20 which comprises a glycol as an anti-icing agent.

25. The method of any one of claims 14, 15, 16, 17, 18, 19, or 20 wherein the surface to which the composition is applied is a glass in a vehicle.

26. The method of any one of claims 14, 15, 16, 17, 18, 19, or 20 wherein the surface is a glass windshield of a vehicle with wipers and wherein the composition contains an organic surfactant for spreading the composition on the glass, and optionally a coloring agent.

27. The method of any one of claims 14, 15, 16, 17, 18, 19, or 20 which in addition contains at least one corrosion inhibitor selected from the group consisting of an alkali metal polymer salt and magnesium succinate, an alkali metal polyaspartate and magnesium succinate, an alkali metal polysuccinimide, an alkali metal polyaspartate, and an alkali metal polymaleimide salt and magnesium succinate.

28. The method of claim 27 wherein the alkali metal polymaleimide salt is sodium polymaleimide salt, the alkali metal polyaspartate is sodium polyaspartate, and the alkali metal polymaleimide salt is sodium polymaleimide salt.

29. A composition packaged for use as a windshield wiper fluid which comprises in admixture:
    (a) a succinate salt selected from the group consisting of Potassium succinate, ammonium, and sodium succinate salts in an amount which acts to remove ice from a surface;
    (b) an organic surfactant which enables spreading of the composition on a glass surface; and
    (c) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the composition melts ice.

30. The composition of claim 29 wherein the succinate salt is selected from the group consisting of potassium succinate (trihydrate), ammonium succinate (anhydrous), sodium succinate (hexahydrate), and combinations thereof.

31. The composition of claim 29 wherein the freezing point depressant is selected from the group consisting of methanol, ethanol, propanol, isopropanol, butanol, pentanol, and mixtures thereof.

32. The composition of claim 29 wherein the ratio of succinate salt to freezing point depressant is between about 1 to 10 to 10 to 1.

33. The composition of claim 29 wherein the ratio of succinate salt to freezing point depressant is about 1 to 1.

34. The composition of claim 29 wherein the composition further comprises water.

35. The composition of claim 34 comprising 20 to 30 wt % solids in solution with the water as the balance.

36. The composition of claim 34 or 35 wherein the freezing point depressant is ethanol.

37. The composition of claim 34 or 35 wherein the freezing point depressant comprises methanol or an admixture of methanol and ethanol.

38. The composition of any one of claims 29, 30, 31, 32, or 33 wherein the composition further comprises a coloring agent.

39. The composition of any one of claims 29, 30, 31, 32, or 33 which comprises a glycol as an anti-icing agent.

40. The composition of any one of claims 29, 30, 31, 32, or 33 which in addition contains at least one corrosion inhibitor selected from the group consisting of an alkali metal polymer salt and magnesium succinate, an alkali metal polyaspartate and magnesium succinate, an alkali metal polysuccinimide, an alkali metal polyaspartate, and an alkali metal polymaleimide salt and magnesium succinate.

41. The composition of claim 40 wherein the alkali metal polymaleimide salt is sodium polymaleimide salt, the alkali metal polyaspartate is sodium polyaspartate, and the alkali metal polymaleimide salt is sodium polymaleimide salt.

42. A composition which comprises in admixture:
    (a) a succinate salt in an amount which acts to remove ice from a surface; and
    (b) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the ratio of the succinate salt to the freezing point depressant in the admixture is about 1 to 1, and wherein the admixture when mixed with water melts the ice more rapidly than either the succinate salt or the freezing point depressant alone.

43. A composition which comprises in admixture:
    (a) a succinate salt in an amount which acts to remove ice from a surface;
    (b) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof; and (c) water, wherein the succinate salt and the freezing point depressant comprise 20 to 30 wt % solids with the water as the balance, and wherein the admixture when mixed with the water melts the ice more rapidly than either the succinate salt or the freezing point depressant alone.

44. A composition which comprises in admixture:
(a) a succinate salt in an amount which acts to remove ice from a surface;
(b) and an organic surfactant which enables spreading of the composition on a glass surface;
(c) a coloring agent; and
(d) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the admixture when mixed with water melts the ice more rapidly than either the succinate salt or the freezing point depressant alone.

45. The composition of claim 42 or 43 which comprises glycol as an anti-icing agent.

46. A composition which comprises in admixture:
(a) a succinate salt other than magnesium succinate in an amount which acts to remove ice from a surface;
(b) at least one corrosion inhibitor selected from the group consisting of an alkali metal polymer salt and magnesium succinate, an alkali metal polyaspartate and magnesium succinate, an alkali metal polysuccinimide, an alkali metal polyaspartate, and an alkali metal polymaleimide salt and magnesium succinate; and
(c) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the admixture when mixed with water melts the ice more rapidly than either the succinate salt or the freezing point depressant alone.

47. The composition of claim 46 wherein the alkali metal polymaleimide salt is sodium polymaleimide salt, the alkali metal polyaspartate is sodium polyaspartate, and the alkali metal polymaleimide salt is sodium polymaleimide salt.

48. A composition packaged for use as a windshield wiper fluid which comprises in admixture:
(a) a succinate salt in an amount which acts to remove ice from a surface; and
(b) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the ratio of succinate salt to freezing point depressant in the admixture is about 1 to 1, and wherein the composition melts ice.

49. A composition packaged for use as a windshield wiper fluid which comprises in admixture:
(a) a succinate salt in an amount which acts to remove ice from a surface;
(b) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof; and
(c) water, wherein the succinate salt and the freezing point depressant comprise 20 to 30 wt % solids with the water as the balance, and wherein the composition melts ice.

50. A composition packaged for use as a windshield wiper fluid which comprises in admixture:
(a) a succinate salt in an amount which acts to remove ice from a surface;
(b) an organic surfactant which enables spreading of the composition on a glass surface,
(c) a coloring agent; and
(d) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the composition melts ice.

51. The composition of claim 48 or 49 which comprises glycol as an anti-icing agent.

52. A composition packaged for use as a windshield wiper fluid which comprises in admixture:
(a) a succinate salt other than magnesium succinate in an amount which acts to remove ice from a surface;
(b) at least one corrosion inhibitor selected from the group consisting of an alkali metal polymer salt and magnesium succinate, an alkali metal polyaspartate and magnesium succinate, an alkali metal polysuccinimide, an alkali metal polyaspartate, and an alkali metal polymaleimide salt and magnesium succinate; and
(c) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the composition melts ice.

53. The composition of claim 52 wherein the alkali metal polymaleimide salt is sodium polymaleimide salt, the alkali metal polyaspartate is sodium polyaspartate, and the alkali metal polymaleimide salt is sodium polymaleimide salt.

54. A method for deicing or anti-icing a surface which comprises applying a composition which comprises:
(a) a succinate salt other than magnesium succinate in an amount which acts to remove ice from a surface; and
(b) at least one freezing point depressant selected from the group consisting of monohydric alcohols having 1 to 6 carbon atoms, polyhydric alcohols having 3 to 12 carbon atoms, monomethyl or monoethyl ethers of polyhydric alcohols having 3 to 12 carbon atoms, and mixtures thereof, wherein the composition melts ice formed on the surface more rapidly than either the succinate salt or the freezing point depressant alone.

* * * * *